Feb. 24, 1925.　　　　　　　　　　　　　　　　　　　　1,527,930
J. C. SMITH ET AL
CULTIVATOR
Filed April 12, 1923
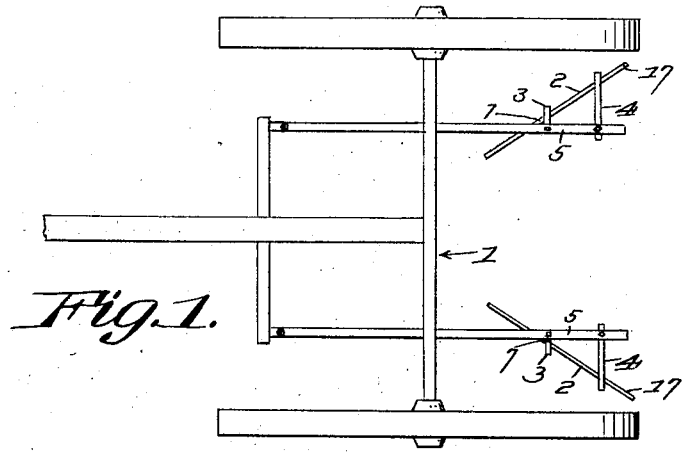
Fig.1.
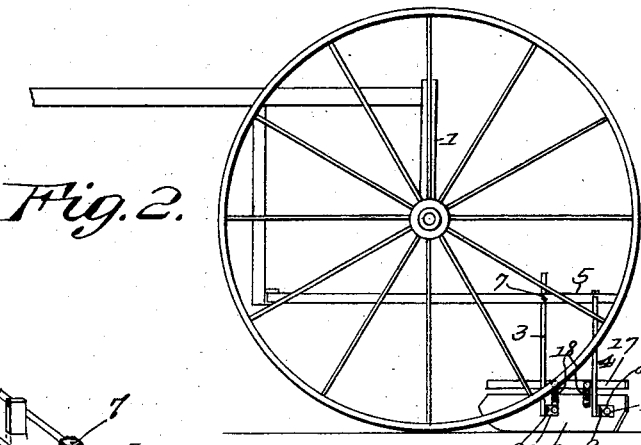
Fig.2.
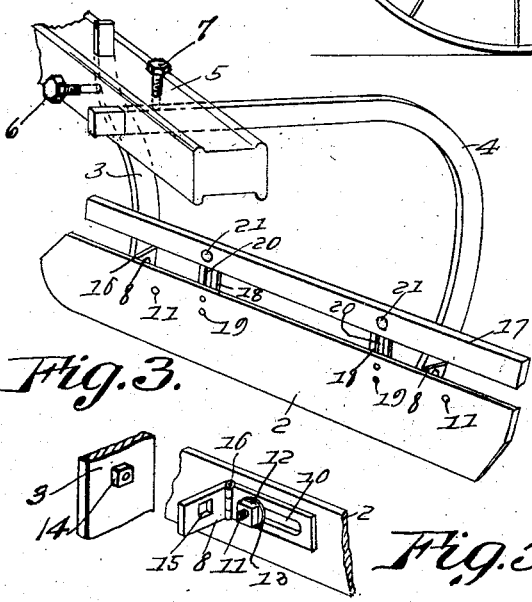
Fig.3.
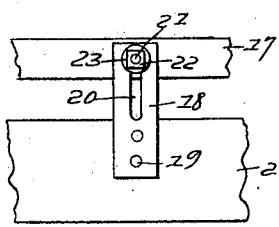
Fig.4.
Fig.5.
Inventors
J.C.Smith and
J.H.Smith,
Attorney Patented Feb. 24, 1925.

1,527,930

UNITED STATES PATENT OFFICE.

JAMES C. SMITH AND JAMES H. SMITH, OF BOONEVILLE, ARKANSAS.

CULTIVATOR.

Application filed April 12, 1923. Serial No. 631,588.

*To all whom it may concern:*

Be it known that JAMES C. SMITH and JAMES H. SMITH, citizens of the United States of America, residing at Booneville, in the county of Logan and State of Arkansas, have invented new and and useful Improvements in Cultivators, of which the following is a specification.

The object of the invention is to provide a cultivator of the scraper type embodying forwardly convergent scraper blades susceptible of adjustment at the forward ends to dispose the blades in proper slant for work either on a level or flat surface or on a raised seed bed, the blades being also adjustable to vary the angle of divergence between them so as to compass a wide or narrow scope in operation. A further object is to provide a fender in connection with each blade and adjustable with respect to the latter to predetermine the amounts of dirt or size clods it is desired the blades shall pass in the operation of the device.

With these objects in view the invention consists in a construction and combination of parts of which a preferred embodiment is shown in the accompanying drawings, wherein:—

Figure 1 is a top plan view of the cultivator embodying the invention.

Figure 2 is a side elevational view.

Figure 3 is a detail perspective view on an enlarged scale illustrating one of the scraper blades and the supporting means therefor.

Figure 4 is a detail elevational view showing the adjustable supporting means for the fender bar.

Figure 5 is a detail perspective view illustrating the scraper blade supporting means.

The invention contemplates the use with a cultivator, such as that illustrated at 1, of the forwardly convergent scraper blades 2 each of which spans an intermediate pendant arm 3 and a rearwardly extending angular arm 4 supported by the cultivator cross head 5, the intermediate arm extending vertically through a suitable opening in the cross head and vertically adjustable with respect to the latter, being held in various adjusted positions by a set-screw 6. The angular arm 4 has its shank extended through a transverse opening in the cross head and is adjustable longitudinally of the shank of the arm and retained in its adjusted position by a set-screw 7. The blade 2 is secured to angular brackets 8 of which one is secured to the intermediate arm 3 and the other to the angular arm 4 by appropriate fasteners such as cap screws 9, that arm of the bracket lying against the scraper blade being slotted longitudinally as indicated at 10 and a button head bolt 11 passing through the scraper blade and through the slot and having attached on its threaded extremity a nut 12 between which and the brackets 8 there is interposed a washer 13. The angular brackets 8 being slotted, provide for longitudinal adjustment of the scraper blade 2, whereby the two blades may be disposed with their forward extremities in substantial contact or adjusted rearwardly with reference to the cultivator 1 to separate the forward extremities and thereby increase the distance between their rear ends thereby increasing the sweep of the cultivator as a whole. The angle of divergence may also be increased or decreased by adjustment of the shanks of the angular arms 4 longitudinally of the shanks by the release and reseating of the setscrews. The shorter arms of the brackets 8 being secured to the arms 3 and 4 by cap screws 14 which engage cross-sectionally angular bosses entering corresponding holes or openings 15 in the shorter arms, said shorter arms are rigidly attached to the arms 3 and 4 and since any angular adjustment of the blades 2 must be attended with a change in the angularity between the arms of the brackets 8, the latter are hingedly or pivotally connected as at 16.

When it is desired to adjust the forward ends of the blades to arrange them in the desired slant or obliquity for work on a seed bed or mound, the intermediate arms 3 are adjusted vertically in the cross head after the release of the set-screws 6 and secured in the adjusted position by tightening of the screw. Such an arrangement provides for raising the forward ends of the blades with reference to the rear ends and secured in the desired position for scraping operations on seed beds or mounds.

Attendant on each scraper blade 2, there is a fender 17, co-extensive with the blade and disposed above the latter being supported by plates 18, secured as at 19 to the blades 2, said plates 18 being formed with longitudinal slots 20 and the fender bar being provided with button head bolts 21 the shanks of which pass through the slots and receive on their threaded ends the nuts 22 between which and the plates there are interposed the washers 23. Obviously the slots 18 provide for adjustment of the fender bars toward and away from the upper edges of the blades, the fender bars serving to move all clods to the middle except those which are small enough to pass through the space between the fender bars and the upper edges of the blade. The adjustment of the fender bar provides for the passage of a relatively small or large amount of dirt over the blades, depending on the character of the work in hand and the judgment of the operator.

Having described the invention, what is claimed as new and useful is:—

1. A cultivator comprising a cross head, an intermediate pendent arm carried by and adjustable vertically in said cross head, an end angular arm adjustable horizontally in said cross head, brackets secured to the lower extremities of said arms, and a scraper blade carried by said brackets, said brackets being of angular form with their arms hingedly connected, one arm of each bracket having a bolt and slot connection with the scraper blades.

2. A cultivator comprising a cross head, a scraper blade, means for supporting said blade from the cross head, a fender bar coextensive with the blade, plates secured on the rear face of the scraper blade and protruding beyond the upper edge of the latter, and bolts passing through the fender bar and through slots formed in the protruding ends of said plates for the adjustment vertically of the fender bar toward and from the upper edge of the scraper blade.

3. A cultivator comprising a cross head, an intermediate pendent arm carried by and adjustable vertically in said cross head, an end angular arm adjustable horizontally in said cross head, angular brackets having their arms hingedly connected and each having one arm secured to the aforesaid intermediate and angular arms respectively at the lower ends of the latter, and a scraper blade adjustably secured to the remaining arms of said brackets.

In testimony whereof they affix their signatures.

JAMES C. SMITH.
JAMES H. SMITH.